June 30, 1964     J. KRISCHKER     3,139,548
ELECTRICAL MOTOR AND DRIVING GEARS FOR TIME-PIECES
Filed April 23, 1962
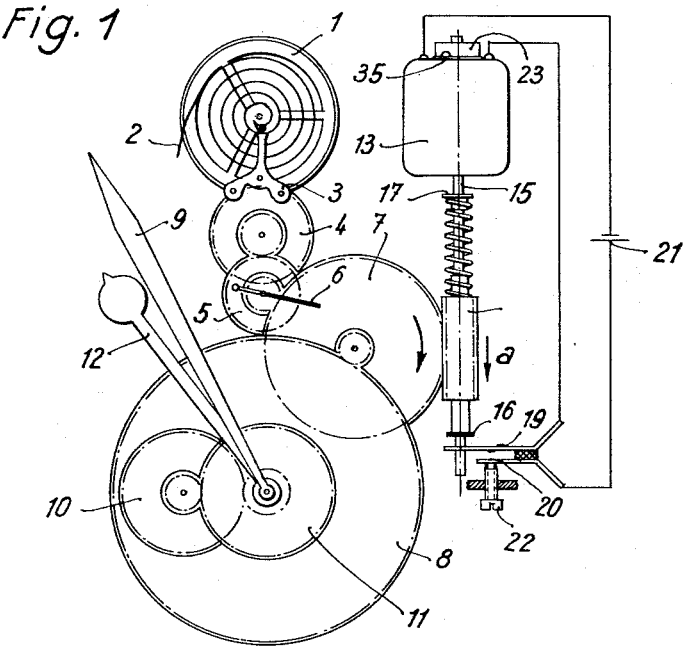
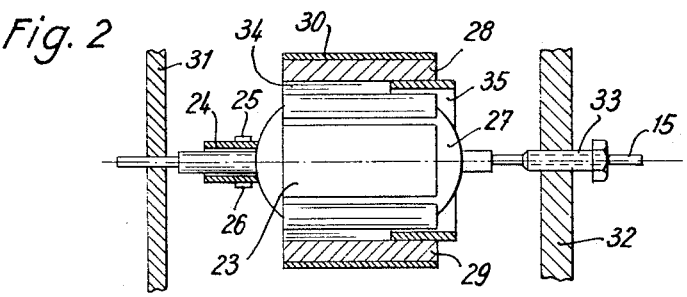
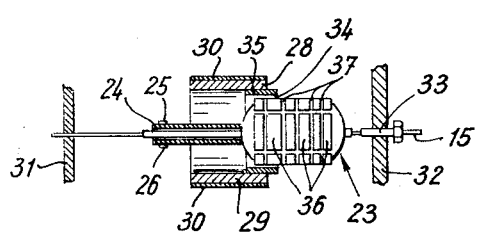
Inventor:
Joseph Krischker
by:
Michael S. Striker
Attorney

United States Patent Office 3,139,548
Patented June 30, 1964

3,139,548
ELECTRICAL MOTOR AND DRIVING GEARS FOR TIME-PIECES
Joseph Krischker, Bad-Neustadt an der Saale, Germany, assignor to Uhrenfabrik Villingen, J. Kaiser G.m.b.H., Villingen, Black Forest, Germany
Filed Apr. 23, 1962, Ser. No. 189,546
13 Claims. (Cl. 310—83)

The present invention concerns driving gears for clocks the mechanical source of power of which drives the movement driving the escapement, being regulated in dependence upon the running down by an escapement regulator and is adapted to be periodically tensioned by means of an electric driving system.

It is known in the case of electric clocks to tension the mechanical source of power for driving the movement again electro-magnetically or electro-mechanically in time periods controlled by the driving gear or movement, e.g. by periodical contact or collector brush actuation. As source of power in these clocks there are used spring power storage or weights possibly both together, in order to obtain a driving power as constant as possible over a certain period of time. Hence such a clock has two sources of power, a mechanical drive driving the movement, and an electrical drive, charging the power storage. The expenditure is therefore comparatively high, since apart from the electromagnet or electric motor, a spring with spring housing, bearings, ratchet means, intermediate gearings etc., are also required.

Thus, it is primarily an object of the present invention to combine the two driving mechanisms practically into one and thereby to save a considerable number of components. It is intended for the power storage to be substituted by means which are anyway already in existence in an electric tensioning device.

It is also an object of the present invention to provide a clock which is without weights and without spring drive and omits the disadvantages of known systems, the driving gear being driven practically exclusively by means of attracting or repelling magnetic forces, without giving up however the simple classis escapement, and without having to put up with additional mechanical loads or stresses and maintaining adequate power supply to the whole drive.

According to the present invention therefore, a driving mechanism for clocks, the mechanical source of power of which is periodically tensioned, and drives the indicating mechanism, and moreover is regulated whilst running down by an escapement movement, and in which a permanent magnetic field, after the change of position of the tensioning device member, exerts magnetic restoring forces on the driving mechanism in the clock-mechanism-driving direction, the change of position being caused by driving elements, is characterised by the feature that during the normal driving operation of the clock mechanism the magnetic forces far outweigh all other force components, for example weight, through the position variable member and the electric driving system of the position variable element is so constructed or equipped with such means that during the whole working strike the magnetic forces are practically constant, preferably by periodically switching the electric driving system on.

It has as a fact already been proposed, in the case of a spring-wound clock with winding by means of a displacement armature motor after winding up, to displace the displacement armature in axial direction by means of the driving spring, whilst opening the contact, the movement being driven by the spring via a worm, however after a predetermined running down of the spring to return the displacement armature into contact closing position exclusively by magnetic attraction force. In this case the magnetic attraction force acts in a driving manner only during the rapid return movement, whilst in "normal operation" the spring force drives the movement. In the subject matter of the present invention however a normal driving spring is completely dispensed with and in "normal operation" the movement is driven by the magnetic force of attraction.

In the present invention, the driving power in "normal operation" is extracted from the energy content of a permanent magnet, or the field thereof, which acts directly as force storage.

As driving force for the movement there is used the force which is released when a body attracted by a permanent magnet or an oppositely poled permanent magnet move towards one another, or when a ferromagnetic body repelled by a permanent magnet or similarly polarised permanent magnet are moved remote from one another. The displaceable body on the one hand is magnetically connected to the magnetic field and on the other hand mechanically connected with the movement to be driven. It is thus a "converter member" of magnetic force into mechanical force. It is therefore of decisive importance for the invention that this magnetic force is adapted to the maximum to the clock. "Maximum adaptation" means that the amount of work transmitted by the power storage must be at a ratio of 1:1 required by the clock and moreover that this ratio is maintained during the period of "normal operation," thus must be constant.

The magnetic field of the permanent magnet according to an expedient progressive development of the invention can be adapted as pot or gap, in which the displaceable body is arranged so as to be rotatably or axially displaceable and by means of magnetism assumes a neutral position or a position of equilibrium. By means of an electric tensioning device the displaceable body can be transferred from this position into a position in which the permanent magnetic forces tend to draw or turn the displaceable body in the direction of the neutral position. In a motor having a permanent magnetic field such forces are released as axial tractive forces, when the rotor has first been laterally displaced out of the stator field. Forces acting in a rotary sense are released when e.g. the magnetic poles of the rotor of a stepping motor after partial rotation do not face in the direction of the stator poles.

The production of these axially and/or radially acting magnetic tractive or thrust forces may be effected by means of electrical e.g. electromagnetic or electromechanical variation of the state or neutral equilibrium or displacement and/or turning/twisting of the displaceable body by overcoming the opposing magnetic captive forces.

Axial displacement of the rotor may be effected in the manner known in clocks having an axially displaceable rotor shaft, for example, by means of a worm arranged on the rotor shaft, which worm engages in a gear wheel of the movement and on the one hand, screwing into the gear wheel when the motor rotates, axially deflects the rotor shaft and hence the rotor, on the other hand, when the motor is stopped, transmits in the manner of a racked bar the magnetic return force to the said gear wheel. The rotor shaft or the worm can actuate a switch contact which switches the motor circuit on when the rotor has moved into the stator field, i.e. the axial tractive or thrust force ceases, and switches it out again, when the rotor has been pushed out of the stator field by a nominal amount.

In order to keep the magnetic thrust or tractive/tensile forces as constant as possible over the whole path of displacement, it is possible in a convenient embodiment of the invention the permanent magnet poles can be accordingly deformed/shaped, for example, bevelled. In accordance with an alternative convenient embodiment of the invention it is however possible to provide a magnetic shunt, which distributes a part of the permanent magnet field uniformly over a greater distance. This, for example, cylindrical magnetic shunt can serve at the same time the homogenization of the magnetic field irregular due to the permanent magnet poles, the motor not only is caused to run with greater smoothness but also shows an increased starting moment in any position. Easy starting can also be obtained moreover by means of an elastic coil spring provided between the rotor or the rotor shaft and the worm mounted so as to be loosely rotatable on the rotor shaft, which spring with one end is fixed to the rotor shaft and with the other end to the worm. This spring moreover may have a non-linear characteristic curve, in that e.g. it has a convolution/winding diameter increased over its length and thus is suitable to compensate errors in the course of power of the magnetic return. This spring is thus not used as driving spring but only as a compensating and coupling spring.

The invention will be described further, by way of example, with reference to the accompanying drawings, in which:

FIG. 1 is a schematic overall view of a clock having a driving gear constructed in accordance with the present invention;

FIG. 2 is a section through a miniature direct current motor with permanent magnetic static field and an axially displaceable rotor; and FIG. 3 is a cross-section of an alternative embodiment for the miniature motor.

The escapement and the indicating gear of the clock shown in FIG. 1 corresponds to the conventional method of construction used in battery operated clocks with magnetic winding. It comprises a balance 1 with coil spring 2, an armature 3, an escapement gear 4, a second gear 5, with a hand 6, an intermediate gear 7, a minute gear 8 with minute hand 9, a minute-hour transmission 10 and an hour gear 11 with an hour hand 12. A worm 14 which is mounted so as to be loosely rotatable on a shaft 15 of an electric motor 13 engages the intermediate gear 7 which connects the escapement of the clock with the indicating mechanism thereof. The worm 14 is connected with a ring 17 rigidly mounted on the shaft 15 by means of a helical spring 18. On the side remote from the spring 18 the worm 14 moreover has a stop collar 16 which, when the worm 14 is axially displaced in the direction of the arrow "a" touches a contact spring 19 and via an opposite contact 20 closes a circuit between a battery 21 and the motor 13. For adjusting the switching time or the displacement path of the shaft 15 or the worm 14, the counter contact 20 is mounted on an adjustment screw 22. The contacts 19, 20 is to be closed when a rotor 23, which is fixed on the shaft 15, has been engaged to such an extent in the stator of the motor 13 that the return force produced by a permanent magnetic stator or rotor field has been practically consumed.

The structure of the motor suitable simultaneously as driving force source for the movement is shown in FIG. 2. The rotor 23, which carries a winding 27, is herein in magnetic equilibrium, i.e. in position in which a magnetic field produced by means of permanent magnet poles 28 and 29 of the stator, no axial tension or tractive forces are active thereon. The shaft 15 also carries a collector 24 for connecting the winding 27. Supported thereon are brushes 25, 26. The stator field moreover is closed over a soft iron cylinder 30. In place of separate poles 28, 29 and the cylinder 30 it is also possible to provide an annular magnetic material stator with correspondingly alternating magnetisation. The rotor shaft 15 is mounted in the bearing supports 31, 32 so as to be rotatably and axially displaceable and adatped to be limited in axial clearance, for example, by means of an axially adjustable bearing and stop bush 33.

As shown moreover in FIG. 2, a cylinder 35 of ferromagnetic material, more specifically soft iron, is provided in the air gap 34 between the stator poles 28, 29 and the rotor 23, which cylinder is inserted with a sliding fit and adapted to be displaceable by hand. The cylindrical ring 35 serves as magnetic shunt and the even distribution of the magnetic field over a certain axial region in order when displacing the rotor 23 in the direction of the shunt ring 35 over the whole displacement path to maintain the return force of the magnetic field on the rotor 23 as constant as possible. Moreover the shunt ring 35 homogenizes the magnetic field in the air gap 34, which is produced by the permanent magnet poles 28, 29, i.e. the field lines are evenly distributed over the whole area.

The escapement and indicating mechanism of the clock shown in FIG. 1 corresponds to the conventional structure in connection with battery operated clocks. The driving force is transmitted to the intermediate gear 7. As source of power is used the driving mechanism described above, which at the driven side has the worm 14. As shown in FIG. 1, the collar 16 closes the contacts 19, 20, when the rotor 23 has been drawn into the stator field of the motor 13, the motor 13 is connected to a battery 21 and starts up. The worm 14 is thus caused to be screwed back against the direction of the arrow "a" in the intermediate gear 7 and pushes the rotor upwards out of the motor 13 by a certain amount. Since directly after the starting of the motor 13 the collar 16 again releases the contact 19, the motor 13 receives only a brief impulse, which causes a rotation of at least one pole graduation, at the most however a few revolutions. The helical spring 18 due to its elasticity permits a practical load-free starting and an axial impact compensation. As the worm 14 is supported also during its turning and movement against the intermediate gear 7 in a direction opposite to that indicated by the arrow a, the power flux is never interrupted.

FIG. 2 shows the forces existing or produced in the motor. In the position shown, i.e. with the rotor 23 fully inserted in the stators 28, 29, 30, the rotor packet/assembly 23 is evenly traversed by the stator field. If however the rotor 23 is displaced to the right in axial direction, then of course magnetic forces are created which tend to draw the rotor 23 into the neutral or equilibrium position shown. The displacement path can thus be limited to the outside by the stop bush 33, whilst the inner definition in accordance with FIG. 1 is effected by the stop collar 16, since, when the collar strikes against the contact 19, the motor 13 is again rotated. The soft iron cylinder 35 provided in the air gap 34 (FIG. 2) causes the magnetic field produced by the stator poles 28, 29 to be uniformly distributed over a certain axial range. The result of this is that the return force exerted on the rotor 23 by the stator field is kept constant or at least substantially constant over the whole permissible axial displacement path of the rotor 23. The ring 35 is adapted to be displaceable by hand for adjustment; the magnetic field can thus be drawn out/extended outwards from the stator to a greater or lesser extent. In order to compensate any still existing curvatures of the power curve it is possible for the spring 18 to have a non-linear curve characteristic. This may be obtained, for example, by providing the windings with a varying diameter. With the same wire diameter helical springs with larger winding diameter are known to be more resilient than those with smaller winding diameter, consequently it is also easy to obtain a non-linear characteristic in the manner stated. The spring 18 itself does not serve as power storage in the conventional manner of clockwork clocks, but acts as compensating member for driving and being driven, i.e. to absorb impacts and vibrations, compensate irregularities etc. Herein only axial forces are concerned however, which are transmitted to the intermediate gear 7 via the worm 14 acting as drive in the manner of a racked bar.

The stator magnets 28, 29, as required in accordance with the problem, carry out a double function, namely on the one hand as motor field and on the other hand as power field for the axial rotor displacement for driving the clock.

A clock constructed in accordance with the present invention is not only cheaper to manufacture than such clocks with conventional driving gear, but is also extremely silent in operation as the motor never reaches the top speed. Moreover the advantage of this is that any possible unbalances in the rotor or irregularities in the field distribution do not come into appearance.

In FIG. 3, the iron body of the rotor 23 in axial direction is assembled from diverse metal plates, e.g. motor armature plate members 36 which for the purpose of obtaining a desired characteristic are with a spaced relationship corresponding to the constant course of the axial displacement of the rotor, are separated from one another by means of possibly different thickness of washers 37, which can consist of non-magnetic material. The diverse plate members 36 may also be made of material having a different magnetic property. Furthermore they may be of different thickness in axial direction. The rotor illustrated in FIG. 3 permits a particularly large displacement path with an attractive force remaining constant over the whole path. The switching frequency is reduced in this case by a multiple, the current consumption drops owing to the switching peaks occurring less frequently, the switching contacts too are actuated more rarely and therefore are subjected to less wear.

I claim:

1. In a drive mechanism of the character described, in combination, first stationary magnetic means; second magnetic means closely spaced from said first magnetic means and movable in axial direction relative thereto between a position of equilibrium and a displaced position in which said second magnetic means is axially displaced relative to said first magnetic means so that the magnetic field created between said magnetic means produces a magnetic force tending to move said second magnetic means in one direction from said displaced position into said position of equilibrium, said magnetic means constructed so that the magnetic force produced by the magnetic field and acting as drive force for the mechanism is substantially constant during movement of said second magnetic means from said displaced position to said position of equilibrium; support means supporting said second magnetic means for movement between said positions thereof; and means cooperating with said second magnetic means for moving the same to said displaced position as soon as it reaches its position of equilibrium and for releasing the same in said displaced position for movement to said position of equilibrium under the influence of said magnetic field.

2. In a drive mechanism of the character described, in combination, a first stationary annular magnetic element having an inner surface; a second substantially cylindrical magnetic element located at least in part in said first annular magnetic element and having an outer surface defining with said inner surface of said first magnetic element an annular air gap between said elements, said second magnetic element being movable in axial direction to one side of said first magnetic element between a position of equilibrium and a displaced position in which said second magnetic element is axially displaced relative to said first magnetic element so that the magnetic field created between said magnetic elements produces a magnetic force tending to move said second magnetic element in one direction from said displaced position into said position of equilibrium; a tubular element of magnetizable material extending spaced from said surface of one of said magnetic elements from said one side partly into said air gap so as to provide at said one side a stronger magnetic field than at the other side of said first magnetic element so that the magnetic force produced by the total magnetic field and acting as drive force for the mechanism is substantially constant during movement of said second magnetic element from said displaced position to said position of equilibrium; support means supporting said second magnetic element for movement between said positions thereof; and means cooperating with said second magnetic element for moving the same to said displaced position as soon as it reaches its position of equilibrium and for releasing the same in said displaced position for movement to said position of equilibrium under the influence of said magnetic field.

3. In a drive mechanism as set forth in claim 2 in which said tubular element is formed from soft iron.

4. In a drive mechanism as set forth in claim 2 in which said tubular element is shiftable in axial direction relative to said first stationary magnetic element.

5. In a drive mechanism of the character described, in combination, a first stationary annular magnetic element having an inner surface; a second substantially cylindrical magnetic element located at least in part in said first annular magnetic element and having an outer surface defining with said inner surface of said first magnetic element an annular air gap between said elements, said second magnetic element being movable in axial direction to one side of said first magnetic element between a position of equilibrium and a displaced position in which said second magnetic element is axially displaced relative to said first magnetic element so that the magnetic field created between said magnetic elements produces a magnetic force tending to move said second magnetic element in one direction from said displaced position into said position of equilibrium, said second magnetic element being composed of a plurality of magnetized plates extending substantially normal to the axis of said second magnetic element and being separated by plates of non-magnetic material and successive plates of non-magnetic material vary in thickness in such a manner so that the magnetic force produced by the magnetic field created between said first magnetic element and said magnetized plates of said second magnetic element and acting as drive force for the mechanism is substantially constant during movement of said second magnetic element from said displaced position to said position of equilibrium; support means supporting said second magnetic element for movement between said positions thereof; and means cooperating with said second magnetic element for moving the same to said displaced position as soon as it reaches its position of equilibrium and for releasing the same in said displaced position for movement to said position of equilibrium under the influence of said magnetic field.

6. In a drive mechanism of the character described, in combination, a first stationary annular magnetic element having an inner surface; a second substantially cylindrical magnetic element located at least in part in said first annular magnetic element and having an outer surface defining with said inner surface of said first magnetic element an annular air gap between said elements, said second magnetic element being movable in axial direction to one side of said first magnetic element between a position of equilibrium and a displaced position in which said second magnetic element is axially displaced relative to said first magnetic element so that the magnetic field created between said magnetic elements produces a magnetic force tending to move said second magnetic element in one direction from said displaced position into said position of equilibrium, said second magnetic element being composed of a plurality of magnetized plates extending substantially normal to the axis of said second magnetic element and each having different magnetic properties in such a manner so that the magnetic force produced by the magnetic field created between said first magnetic element and said magnetized plates of said second magnetic element and acting as drive force for the mechanism is substantially constant during movement of said second magnetic element from said displaced position to said position of equilibrium; support means supporting said second magnetic element for movement between said positions thereof; and means cooperating with said second magnetic element for moving the same to said displaced position as soon as it reaches its position of equilibrium and for releasing the same in said displaced position for movement to said position of equilibrium under the influence of said magnetic field.

7. In a drive mechanism of the character described, in combination, a first stationary annular magnetic element having an inner surface; a second substantially cylindrical magnetic element located at least in part in said first annular magnetic element and having an outer surface defining with said inner surface of said first magnetic element an annular air gap between said elements, said second magnetic element being turnable about its axis relative to said stationary first magnetic element and movable in axial direction to one side relative to said first magnetic element between a position of equilibrium and a displaced position in which said second magnetic element is axially displaced relative to said first magnetic element so that the magnetic field created between said magnetic elements produces a magnetic force tending to move said second magnetic element in one direction from said displaced position into said position of equilibrium, said magnetic elements constructed so that the magnetic force produced by the magnetic field and acting as drive force for the mechanism is substantially constant during movement of said second magnetic element from said displaced position to said position of equilibrium; support means supporting said second magnetic element for movement between said positions thereof and for turning movement about its axis; and means cooperating with said second magnetic element for rotating the same about its axis as soon as it reaches its position of equilibrium and for moving during such rotation said second magnetic element from said position of equilibrium to said displaced position, for stopping rotation thereof when it reaches said displaced position, and for releasing the same in said displaced position for movement to said position of equilibrium under the influence of said magnetic field.

8. In a driving mechanism of the character described and including a gear train and an escape mechanism, in combination, a first stationary annular magnetic element having an inner surface; a second cylindrical magnetic element coaxially arranged at least in part within said first annular magnetic element and having an outer surface defining with said inner surface of said magnetic element an annular air gap between said elements, said second magnetic element being turnable about its axis and movable in axial direction relative to said first stationary magnetic element between a position of equilibrium in which said second magnetic element is axially displaced relative to said first magnetic element so that the magnetic field created between said elements produces a magnetic force tending to move said second magnetic element in one direction from said displaced position into said position of equilibrium, said magnetic elements constructed so that the magnetic force produced by the magnetic field and acting as a drive force for the mechanism is substantially constant during movement of said second magnetic element from said displaced position to said position of equilibrium; support means supporting said second magnetic element for turning movement between said positions thereof; electric circuit means incorporated in one of said magnetic elements and cooperating with said elements to cause when energized turning of said second element about its axis; energizing means for energizing said electric circuit means and including a switch cooperating with said second magnetic element for closing said switch when said second magnetic element is in said position of equilibrium and for opening said switch when said second magnetic element moves from said position of equilibrium toward said displaced position; and connecting means connecting said second magnetic element with one gear of said gear train for directly driving the latter during movement of said second magnetic means in said one direction and during turning thereof about its axis and for moving said second magnetic element during turning about its axis from said position of equilibrium to said displaced position.

9. In a drive mechanism as set forth in claim 8 and including a shaft coaxially fixed to said second magnetic element, and said connecting means including a worm mounted on said shaft for rotation therewith and meshing with said one gear of said gear train.

10. In a drive mechanism as set forth in claim 9 in which said worm is loosely mounted on said shaft and said connecting means including further a coil spring surrounding said shaft and connected at one end thereof to said shaft and at the other end thereof to said worm.

11. In a drive mechanism as set forth in claim 10 in which said coil spring has a non-linear characteristic.

12. In a drive mechanism as set forth in claim 10 in which said coil spring has successive coils of varying diameter.

13. In a drive mechanism of the character described, in combination, a first stationary annular magnetic element having an inner surface; a second substantially cylindrical magnetic element located at least in part in said first annular magnetic element and having an outer surface defining with said inner surface of said first magnetic element an annular air gap between said elements tapering toward one end of said first magnetic element, said second magnetic element being turnable about its axis and movable in axial direction relative to said first magnetic element between a position of equilibrium and a displaced position in which said second magnetic element is axially displaced relative to said first magnetic element to extend beyond said one end thereof so that the magnetic field created between said magnetic elements produces a magnetic force tending to move said second magnetic element from said displaced position into said position of equilibrium, said tapering air gap constructed so that the magnetic force produced by the magnetic field and acting as a drive force for the mechanism is substantially constant during movement of said second magnetic element from said displaced position to said position of equilibrium; support means supporting said second magnetic element for movement between said positions thereof and for turning movement about its axis; and means cooperating with said second magnetic element for rotating the same about its axis as soon as it reaches its position of equilibrium and for moving during such rotation said second magnetic element from said position of equilibrium to said displaced position, for stopping rotation thereof when it reaches said displaced position and for releasing the same in said displaced position for movement to said position of equilibrium under the influence of said magnetic field.

References Cited in the file of this patent
UNITED STATES PATENTS
1,208,147    Hall _____ Dec. 12, 1916
OTHER REFERENCES
German application 1,097,912, printed Jan. 19, 1961.